United States Patent [19]
Hutton, Jr.

[11] Patent Number: 5,864,126
[45] Date of Patent: Jan. 26, 1999

[54] SELF READING PERMANENT ELECTRONIC LABEL FOR A COMPUTING DEVICE

[75] Inventor: Edward W. Hutton, Jr., Columbia, S.C.

[73] Assignee: NCR Corporation, Dayton, Ohio

[21] Appl. No.: 764,402

[22] Filed: Dec. 11, 1996

[51] Int. Cl.⁶ .................................................. G06F 15/24
[52] U.S. Cl. ......................... 235/385; 235/487; 235/375
[58] Field of Search .................................. 235/375, 385, 235/438, 439, 459, 461, 487

[56] References Cited

U.S. PATENT DOCUMENTS

| | | | |
|---|---|---|---|
| 2,953,300 | 9/1960 | O'Brian et al. | 235/61.12 |
| 4,074,258 | 2/1978 | Dore et al. | 340/347 |
| 4,280,185 | 7/1981 | Martin | 364/506 |
| 4,809,426 | 3/1989 | Takeuchi et al. | 235/439 |
| 5,070,726 | 12/1991 | Fukui et al. | 73/116 |
| 5,128,519 | 7/1992 | Tokuda | 235/375 |
| 5,231,271 | 7/1993 | Hino et al. | 235/375 |
| 5,241,160 | 8/1993 | Bshan et al. | 235/375 |
| 5,287,414 | 2/1994 | Foster | 235/385 |
| 5,450,385 | 9/1995 | Ellis et al. | 235/385 |
| 5,455,409 | 10/1995 | Smith et al. | 235/385 |
| 5,548,106 | 8/1996 | Liang et al. | 235/472 |
| 5,552,588 | 9/1996 | Schneider | 235/385 |
| 5,567,927 | 10/1996 | Kanh et al. | 235/385 |

*Primary Examiner*—Anita Pellman Gross
*Assistant Examiner*—Karl D Frech
*Attorney, Agent, or Firm*—Steven J. Adamson

[57] ABSTRACT

A permanent electronic serial number unit for use with a network electronic device that includes a member having a machine readable pattern of unique identification information, a mechanism for propagating a read signal onto the member and a mechanism for detecting the read signal after it has been propagated to the member. The unit is preferable coupled to the processor of an electronic device connected to a network such that the electronic device may be identified by the network administrator. The unit may be positioned in the structural frame of an electronic device such that the same unique identification information is visible in a human readable form on the exterior of the frame.

11 Claims, 2 Drawing Sheets

5,864,126

SELF READING PERMANENT ELECTRONIC LABEL FOR A COMPUTING DEVICE

FIELD OF THE INVENTION

The present invention relates to providing a permanent unit serial number to computers in a network.

BACKGROUND OF THE INVENTION

The data storage and processing industry has experience a significant increase in the use of network computers at all levels. Each computer in such a network usually receives a printed serial number at the time of its manufacture. This serial number is important for service, warranty and auditing purposes, amongst other reasons.

Traditionally, serial numbers were imprinted on plates affixed to an exterior wall of a computer, normally on the back. For purposes of the description herein, these serial numbers will be termed physical serial numbers. More recently, electronic serial numbers have been developed in which a circuit board inside the computer has a memory location in which the electronic serial number is stored. This electronic serial number, which may or may not conform with the physical serial number, can be read over a network by a network administrating computer. The network administrating computer may also read and log status information for each computer.

Though beneficial, a problem with this type of electronic serial number is that each board or "card" within a computer is subject to a certain failure rate and boards within a computer are switched upon the occurrence of a failure and also in response to scheduled maintenance. When the board containing an electronic serial number is switched out of the computer, the unique serial number is lost. Accordingly, a need exists for providing a permanent electronic serial number.

Furthermore, during company audits and similar asset management activities, auditors are often required to crawl behind and below desks and other office equipment to read physical serial numbers. If the permanent electronic serial number is configured in such a manner as to conform with the physical serial number, then these types of audits and related investigations could be done through the network administrating computer.

SUMMARY OF THE INVENTION

It is an object present invention to provide a computer or computer frame with a permanent electronic serial number.

It is another object of the present invention to provide a permanent electronic serial number that is readable by another computer.

And it is also an object of the present invention to provide a permanent electronic serial number that conforms with a physical serial number.

These and related objects of the present invention are achieved by use of permanent electronic serial number unit described herein in which a member having a machine readable pattern of unique identification information is provided in a fixed relationship with a means for reading the identification information on that member.

The unit may be mounted to the frame of a computer or other electronic device that is capable of connection to a network. The unit is coupled to the control logic of a networked computer in such a manner that the unique identification information may be read by another computer connected to the same network. Such an arrangement permits remote identification of a computer.

The energy medium used by the reading means may be optical, magnetic, electric, nuclear, or other suitable media.

The pattern may be configured such that it is read by reflection or through propagation of an incident signal. Placement of at least of portion of the unit on an external surface of a computer frame permits corresponding identification information to be provided on the computer frame in a human visible format and in a location that can be seen by a human.

The attainment of the foregoing and related advantages and features of the invention should be more readily apparent to those skilled in the art, after review of the following more detailed description of the invention taken together with the drawings.

DETAILED DESCRIPTION OF PREFERRED EMBODIMENT

Though well suited for use with computers, the present invention is applicable to any electronic device that can be connected to a network, and the term computer as used herein is intended to include such other devices.

Figure 1:
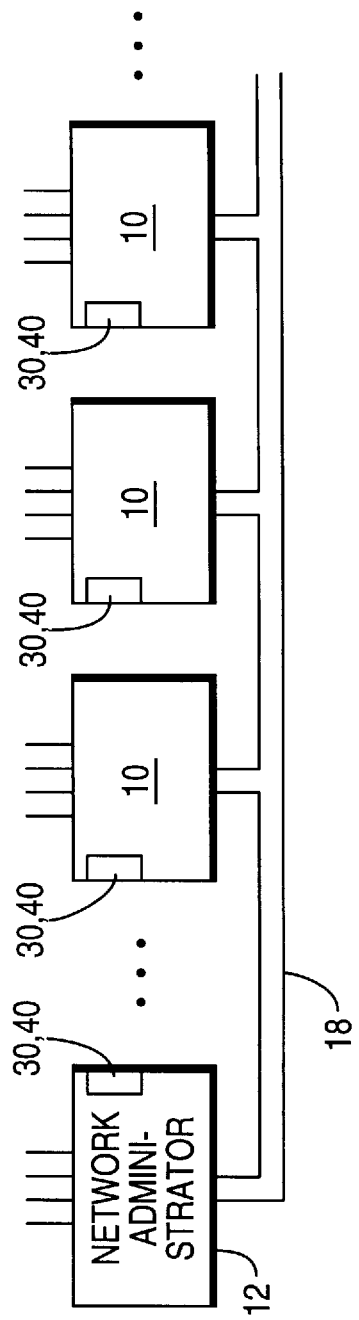
FIG. 1 is a schematic view of a plurality of computers connected in a network.

Referring to FIG. 1 a schematic view of a computer network is shown. The network includes a plurality of computers, each represented by reference numeral 10, and a network administering computer 12. The computers are joined by a cable 18. The network of FIG. 1 represents coaxial cable, optical fiber, or wireless RF physical interconnection for networking or Internetworking. A unique permanent electronic serial number unit 30,40 is provided in each computer 10 (and 12). The unique permanent electronic serial number is indicated with reference numeral 30 in a first embodiment and 40 in a second embodiment.

Figure 2:
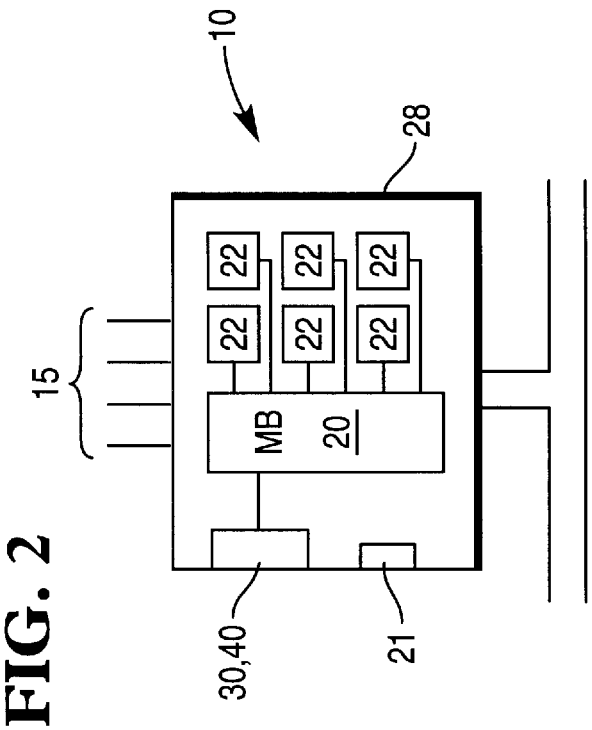
FIG. 2 is a schematic view of one of the network computers illustrated in FIG. 1.

Referring to FIG. 2, a schematic view of one of the computers 10 of the network illustrated FIG. 1 is shown. This computer is representative of various types of electronic processing or computing devices, including personal computers, servers, clients, routers, internet connection devices, etc. Generally, the computer includes a mother board 20 (having one or more processors) and a plurality of other boards generally represented by reference numeral 22 mounted within a frame 28. These others boards may include I/O, sound, memory, network adaptor and modem cards, etc. Frame 28 represents any structural member of an electronic device upon which circuitry can be mounted including, but not limited to, metal frames for desk top and work station computers and plastic molded frames for notebook computers.

A plurality of output lines 15 are provided to represent connection to a mouse, keyboard, monitor, printer, scanner, or other peripheral device. The permanent electronic serial number unit 30, 40 is shown coupled to the mother board 20 (or an analogous processor board on communications, display or network electronic devices). The computer 10 may also include a front panel display 21, where information, including the serial number can be displayed.

Figure 3:
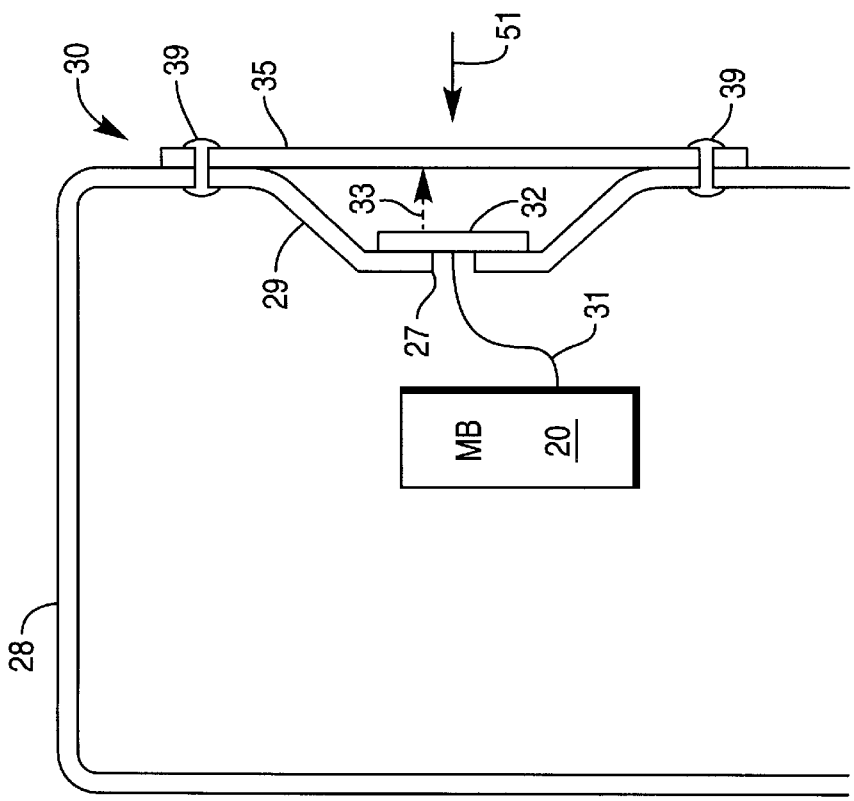
FIG. 3 is a partial cross-sectional view of apparatus for providing a permanent electronic serial number in accordance with the present invention.

Referring to FIG. 3, a partial cross-sectional view of a computer frame 28 including permanent electronic serial number unit 30 is shown. The computer frame 28 includes an indentation 29 having a hole 27 formed therein through which signal line 31 passes. Signal line 31 is coupled between the mother board 20 and an LED/photo detector array 32. In response to a signal from a processing unit in mother board 20, the LED and photo detector array 32 are energized to propagate a light signal indicated by dashed line 33 upon plate 35. Plate 35, as discussed below with reference to FIG. 4, includes a pattern which encodes a unique serial number and is optically readable. Light reflected by the pattern is detected by photo detector array 32 and a signal indicative of the encoded serial number is generated and propagated to the mother board.

Arrow 51 identifies the line of sight of a human reading an exterior portion of plate 35. The interior side of plate 35 is machine readable, while the exterior side is readable by a human. In this manner only one serial number plate need be generated for a computer and it is a permanent indication of a unique serial number for that computer. Plate 35 may be affixed to frame 28 by a plurality of rivets 39 or through welding or the like. In addition, plate 35 could be formed integrally within the frame, while the indentation 29 is provided by a mounting bracket. Also, both plate 35 and indentation 29 (and the accompanying electronic components) could be mounted as an individual unit to the frame, with line 31 connecting the unit to the motherboard.

Figure 4:
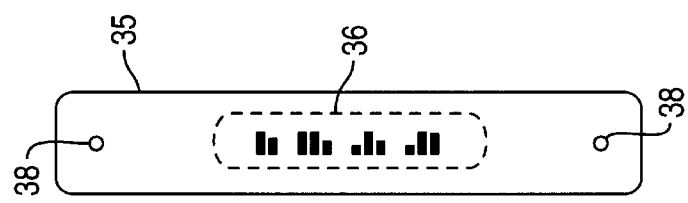
FIG. 4 is a view of a plate for use with the apparatus of FIG. 3.

Referring to FIG. 4, an interior view of plate 35 is shown. The pattern 36 is enclosed in a dashed oval. This pattern may be configured in bar code, 2-D array or any other machine readable format, including optical character recognition. Pattern 36 may be formed by machining openings in plate 35, which is preferably a rigid material such as aluminum or with reflective or non-reflective substance provided on a tape or label. Bore holes 38 are provided in plate 35 for affixation with rivets or screws.

Figure 5:
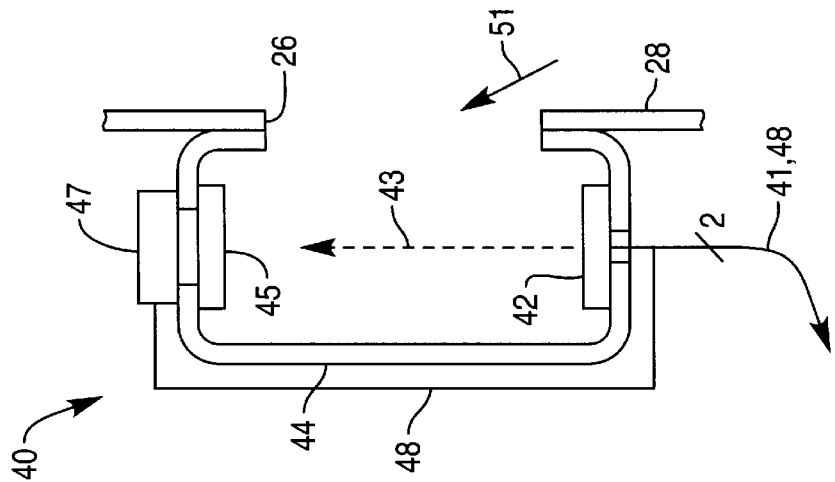
FIG. 5 is a partial cross-sectional plan view of a portion of a frame for a computer including another embodiment of apparatus for providing a permanent electronic serial number in accordance with the present invention.

Referring to FIG. 5, a partial cross-sectional plan view of an alternative permanent electronic serial number unit 40 in accordance with the present invention is shown. Frame 28 includes an opening 26 to which a bracket 44 is mounted. An LED array or other light source 42 is connected to bracket 44 and connected via line 41 to a mother board (not shown). A light signal 43 is propagated from array 42 such that it impinges upon plate 45 which is analogous to plate 35. Instead of operating in a reflective manner, however, as was the case for unit 30, a photo detector array 47 is provided behind plate 45 to detect light which passes through a pattern in plate 45. A signal indicative of light received by photo detector array 47 is propagated along line 48. The pattern in plate 45 is as described above with reference to pattern 36 in plate 35, however, the pattern is necessarily machined or formed of a transparent material so that light may pass through the pattern onto detector 47. Arrow 51 indicates the line of sight of a human visually inspecting a serial number printed on the exterior side of plate 45.

Though the present invention includes optical signal generation and detection, it should be recognized that signal generation and detection means based on other types of energy are within the present invention. These including, for example, replacing LED/Photo detection array 32 with:(1) magnetic sensors to detect the openings in the pattern or embedded magnetic material such as $FeO_2$ used in place of the openings; (2) infrared emitter and detector elements, (3) modulated frequency generators and detectors 32; or (4) nuclear particle detectors 32 with the pattern formed or a nuclear particle source such as trittrium or radium; etc.

The present invention also includes a circuit board fixedly mounted to a device frame having signal trace pattern comprising a plurality of parallel signal traces connected to ground. These signal traces can be severed such that they provide a unique binary representation at a port coupled to the signal traces. For example, if there are eight signal traces provided and the first, third, fifth and seventh are severed, then the binary representation is 10101010 or 0xAA.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computer apparatus suitable for use in a desk top computing environment, comprising:

processing logic;

a network adapter mechanism coupled to said processing logic that permits said computing apparatus to communicate with another computing apparatus coupled to said network adapter mechanism;

a mechanism that reads machine readable identification information; and a unique identifier coupled to said computing apparatus that has a first face with human readable identification information and a second face with machine readable identification information, wherein said first face is disposed so as to be visible from an exterior of said computing apparatus and said second face is disposed so as to be readable by said readable information reading mechanism from an interior of said computing apparatus.

2. The apparatus of claim 1, wherein said first face and said second face are oriented differently.

3. The apparatus of claim 1, further comprising at least two of the group of computer components consisting of: a disk drive, a sound card, a video card, a modem card and a CDROM, coupled to said processing logic.

4. The apparatus of claim 1, further comprising an input device and an output device coupled to said processing logic.

5. The apparatus of claim 1, wherein said reading mechanism includes a signal impinging mechanism and a signal detecting mechanism and said member is disposed between said impinging and detecting mechanisms, said impinging and detecting mechanisms are internal to said computer apparatus and said portion of said member having human readable identification information is visible from an exterior of said computer apparatus.

6. The apparatus of claim 1, wherein said reading mechanism comprises an LED and a photo detector array, said member being disposed in relation thereto such that the amount of absorption or reflection of light from said LED by said member is indicative of the content of the machine readable identification information.

7. The apparatus of claim 1, wherein said reading mechanism utilizes an optical signal.

8. The apparatus of claim 1, wherein said reading mechanism utilizes an electromagnetic signal.

9. A stand alone computing device, comprising:

a frame;

a processor coupled to said frame and disposed on an interior of said frame;

a network adapter device coupled to said processor that is capable of connecting said processor to a computer network;

a member mounted to said frame having a first pattern of unique machine readable identification information and a second pattern of corresponding human readable identification information, said member being disposed in relation to said frame in such a manner that said human readable identification information is visible from an exterior of said computing device;

a mechanism mounted within said computing device that impinges a read signal upon said first pattern; and a mechanism mounted within said computing device that detects at least a portion of said read signal after the read signal has been impinged on the first pattern and that generates a value representative of the unique identification information based on said detected read signal.

10. The apparatus of claim 9, wherein said member with said machine readable identification information and said corresponding human readable identification information is a single member and said machine readable identification information and said corresponding human readable identification information are oriented in different directions.

11. The apparatus of claim 9, further comprising two or more of the group of computer components consisting of: a disk drive, a sound card, a network adapter card, a modem card, and a CDROM.

\* \* \* \* \*